United States Patent [19]

Thornley et al.

[11] Patent Number: 4,507,910

[45] Date of Patent: Apr. 2, 1985

[54] AUTOMATIC SONAR ACTIVATED HEIGHT CONTROL FOR A HEADER

[75] Inventors: W. Ray Thornley, Hyde Park; James G. Wiser; E. Cordell Lundahl, both of Logan, all of Utah

[73] Assignee: Ezra C. Lundahl, Inc., Logan, Utah

[21] Appl. No.: 553,840

[22] Filed: Nov. 21, 1983

[51] Int. Cl.$^3$ .............. A01D 41/00; A01D 41/12; A01D 45/00

[52] U.S. Cl. .............. 56/10.2; 56/DIG. 15

[58] Field of Search ............... 56/10.2, DIG. 15

[56] References Cited

U.S. PATENT DOCUMENTS

| | | | |
|---|---|---|---|
| 3,094,693 | 6/1963 | Taylor | 56/DIG. 15 |
| 3,727,332 | 4/1973 | Zimmer | 56/DIG. 15 |
| 3,906,710 | 9/1975 | Pask | 56/DIG. 15 |
| 3,935,866 | 2/1976 | Northup et al. | 56/DIG. 15 |
| 4,136,508 | 1/1979 | Coleman et al. | 56/DIG. 15 |
| 4,228,636 | 10/1980 | Homburg | 56/DIG. 15 |
| 4,414,792 | 11/1983 | Bettencourt et al. | 56/10.2 |
| 4,437,295 | 3/1984 | Rock | 56/DIG. 15 |

FOREIGN PATENT DOCUMENTS

| | | | |
|---|---|---|---|
| 778092 | 2/1968 | Canada | 56/10.2 |
| 2532407 | 2/1977 | Fed. Rep. of Germany | 56/DIG. 15 |
| 197806 | 6/1978 | Fed. Rep. of Germany | 56/DIG. 15 |
| 2900841 | 7/1980 | Fed. Rep. of Germany | 56/10.2 |
| 948323 | 8/1982 | U.S.S.R. | 56/10.2 |

*Primary Examiner*—Paul J. Hirsch
*Attorney, Agent, or Firm*—B. Deon Criddle

[57] ABSTRACT

An automatic height control system for a header on a farm implement is disclosed wherein the height of the header is continuously controlled in response to the height of the crop on which the header is operating. The top of the crop is detected by sonar detection units, and appropriate electronic and electromechanical means are provided for controlling the height of the header in response to signals from the sonar detection units.

11 Claims, 7 Drawing Figures

AUTOMATIC SONAR ACTIVATED HEIGHT CONTROL FOR A HEADER

BACKGROUND OF THE INVENTION

The present invention relates generally to control of the operating height of a header of a mobile harvester or other farm implement. In particular, the present invention relates to a system for automatic height control responsive to ultrasonic range finding means which measures the distance to the top of the crop just forward of the header as the harvester or other farm implement is directed through the crop.

Harvesting of crops using modern, automated machinery can be onerous and tiring with the machinery used being large, heavy and highly complicated. In addition to guiding the harvester or other farm implement, such as a tractor, to which the header is attached, the operator has to be aware of various other operations and conditions which require independent action and reaction by the operator. It has heretofore been realized that it would be highly desirable to provide an automatic header height control system to aid the operator of the harvester in maintaining the header at an optimium operating height. Typical systems which have been proposed incorporate mechanical sensors or feelers. In one type of system, one or more ground following mechanical sensors or feelers are used to control a hydraulic or other power lift means for varying the height of the header relative to the ground directly beneath the header. See for example U.S. Pat. Nos. 3,908,345; 4,307,560; 4,312,177; 4,327,540; 4,332,126; and 4,354,555. These systems are responsive to changes in ground contour but otherwise operate on the assumption that the crop grows to a uniform height above the ground.

In a more direct attempt to determine the height of the crop itself researchers from the University of Saskatchewan, Saskatoon, Canada reported of their work in a paper entitled "An Automatic Height-of-Cut Control System For Windrowing" which was presented to the 1973 Annual Meeting of American Society of Agricultural Engineers (Paper No. 73-155). In this work, a sensor was located above the table canvas. The sensor consisted of two steel levers attached to microswitches. The microswitches are adapted to be activated by the cut crop as it falls on the table canvas behind the reel of the harvester. The system, unfortunately, suffered from mechanical instability and crop flow interference.

Numerous other disclosures of guidance systems for self-propelled vehicles including farm equipment are found in the patent literature. Generally, the proposed guidance systems operate in response to actuation of some type mechanical feeler means which generally engages a furrow, trench or other tracking means formed by or supported on the ground. Examplary of such disclosures are the following:

U.S. Pat. Nos.: 2,068,403; 3,039,554; 3,180,280; 3,188,978; 3,254,608; 3,402,787; 3,492,949; 3,537,531; 3,581,838; 3,708,019; 3,765,501; 3,797,602; 3,844,372; 3,946,825; 3,982,602; 4,161,143; 4,165,796; 4,184,551; 4,219,093; 4,301,739; 4,304,316; 4,366,756.

In a paper entitled "Swather Edge Guide Control System" which was presented to the 1975 Annual Meeting of the American Society of Agricultural Engineers (Paper No. 75-1029), researchers again from the University of Saskatchewan, Saskatoon, Canada, reported on a program to develop an automatic steering control system for a self-propelled swather. Three types of sensors were reported as being tested and evaluated. First, the electromechanical (feeler type) sensors of the prior art were considered undesirable inasmuch as they required contact with the crop edge and were prone to excessive wearing and ultimate malfunction. Second, ultrasonic sensors were found to completely fail to obtain sufficient reflection from the crop edge and, thus, were reported as being unfunctional and completely inoperative. Third, infrared photoelectric sensors were found capable of giving a good indication of the position of the crop. Inherent problems with the infrared sensing system were found to be accumulation of dirt on the infrared source and the sensor, and the variation in the output of the sensors in response to the color of the crop. The latter problem was caused by more infrared radiation being reflected from lighter colored crops than from darker colored crops.

An ultrasonic linkage system which was developed to link an operator-controlled tractor to an automatically controlled tractor in a master-slave mode was reported in Paper No. 76-1072 entitled "Ultrasonic Linkage for Tractor Guidance" which was given at the 1976 Annual Meeting of the American Society of Agricultural Engineers. The researchers, again from the University of Saskatchewan in Saskatoon, Canada, found that the slave tractor could be controlled using multiple sonic paths using tuned transmitters and receivers for initiating and receiving the sonic signals.

Sonar has for some time been used for depth indications for bodies of water and is widely used in shipping and ocean exploration. However, such usages of sonar do not suggest utilization of sonar means to activate a guidance mechanism for automatically controlling the height of a header on a mobile harvester or other piece of farm equipment in response to ultrasonic range finding means which measures the distance to the top of the crop just forward of the header. For automatic guidance of headers on farm machinery, the accuracy of the sonar guidance apparatus over short ranges must be quite high and the need for fast response and elimination of noise interference is essential.

SUMMARY OF THE INVENTION

It is, therefore, a principal object of the present invention to provide automatic header height control on farm machinery in which the height of the header is maintained in response to a sonar activated guidance system which monitors the top of the crop just ahead of the header. In particular, it is an object of the invention to provide a guidance system which automatically guides or positions the header relative to the height of the crop which is being harvested.

These and additional objects of the present invention are achieved by providing an automatically controlled header height mechanism for farm equipment wherein the mechanism for controlling the height of the header comprises a sonar range finding means and associated electronic circuitry. The range finding means employs a sonic transducer which operates as both a transmitter and a receiver, and the electronic circuitry is adapted to process the transmitted sonar signals and the returning, reflected echoes, which are received from the top of the standing crop just ahead of the header, to thereby generate a control signal for positioning the header at a proper height. The electronic circuitry contains automatic gain control and detection means to separate actual return echoes from false signals and environmental noise.

In accordance with the present invention, the farm implement, such as a harvester or windrower, is provided with at least one sonar sensor unit which operates as both a transmitter and a receiver. The sonar sensor unit is mounted on the farm implement just ahead of the header, and the sonar sensor unit transmits a sonar signal which is relfected from the top of a standing crop. The reflected echoes from the tops of the crop are monitored or detected by the receiver portion of the sonar unit, and the data generated by the sonar transmitter/receiver is then processed by electronic circuitry means comprising a logic circuit to determine whether the distance between the sonar sensor unit and the top of the crop is within allowable tolerances. If the distance is not within the allowable tolerances, the logic circuit is adapted to determine if the actual distance is less than or greater than the desired distance. The electronic circuitry then generates control signals to adjust the positioning of the header to bring the header within the desired distance with respect to the crop. In a preferred embodiment of the invention, a pair of sonar sensor units are provided, one mounted at each side of the vehicle. This allows the control of either end of the header independent of the other end.

The positioning of the header can be achieved by several methods. Preferably, a hydraulic ram is associated with the header. The header is adapted with gauge wheels at its trailing end, and the hydraulic ram is connected between the frame of the gauge wheels and the frame of the header, such that by selectively activating the hydraulic ram, the height of the header can be adjusted relative to the ground surface. The hydraulic ram is actuated by actuation means which respond to the control signals generated by the electronic circuitry of the automatic header height control mechanism. In a preferred embodiment wherein the header is provided with a reel and a cutter mechanism, means are provided for proportionally adjusting the cutter bar height to the height of the reel. In one form of this embodiment, the height of the crop is monitored relative to the reel, and the reel is adjusted to maintain the desired distance between the top of the crop and the reel. In addition, the reel and the cutter mechanism are interconnected by proportioning support structure in which the cutter mechanism is raised or lowered in proportion to the raising and lowering of the reel.

Additional features and objectives of the present invention will become apparent from the following detailed description, taken together with the accompanying drawings.

THE DRAWINGS

DESCRIPTION OF THE PREFERRED EMBODIMENT

Figure 1:
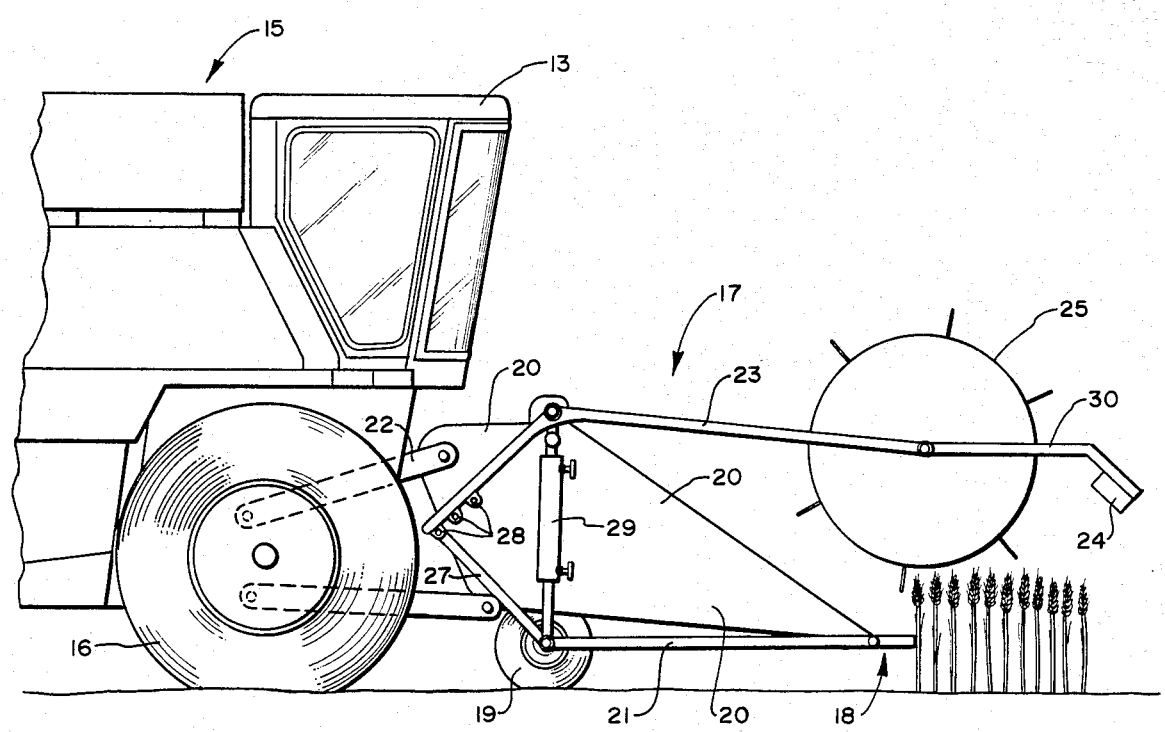
FIG. 1 is a diagramatical right-hand side elevation of a forward portion of a farm implement, such as a harvester or combine, with a header comprising a cutter bar and a reel mounted in front of the farm implement, and wherein the header is provided with an automatic header height control system in accordance with the present invention.

In accordance with the present invention, an agricultural vehicle such as a harvester, windrower, etc., is provided with a header unit and the header unit is in turn provided with a novel automatic system for controlling the height of the header with respect to ground surface and the top of the crop immediately ahead of the header. A diagramatic view of a typical farm vehicle such as a harvester or windrower having a header unit attached to the front end thereof is shown in FIG. 1.

As illustrated, the mobile body 15 of the farm implement is supported above the ground on a pair of forward drive wheels 16, and includes a forward operator station 13. The farm implement carries a header 17 mounted to the front of the mobile body 15. In this embodiment, a forward crop gathering unit is exemplified by a grain cutting platform 18 rigidly attached to a feeder housing 20, and forming part of the header 17 which is coupled to the mobile body 15 of the farm implement for vertical movement with the linkage.

The header is further supported by a pair of guage wheels 19 and a support frame structure. The support frame structure comprises identical framework on the opposite lateral sides of the header 17. The right-hand framework is shown in FIG. 1, and the left-hand framework, although not shown, is the same as the right-hand framework except being the mirror image thereof. The framework comprises a lower elongate support 21 extending between the axis of the guage wheels 19 and the grain cutting platform 18. The support 21 is pivotally attached to the axis of the support wheels 19 at its one end and further pivotally attached to the grain cutting platform 18 at its other end. An elongate reel supporting member 23 extends forwardly from a pivotal connection at the upper edge of the feeder housing 20. The trailing end of the reel supporting member 23 is bent downwardly at the pivotal connection to the upper edge of the feeder housing 20. The reel supporting member 23 is adapted to pivotally support the reel 25 of the header at its other end. Although not specifically shown, means which are well known in the art are associated with the reel support member 23 and the reel 25 for rotating the reel about a substantially horizontal axis. An elongate linkage 27 is pivotally attached at one of its ends to the axis of the support wheels 19 and further pivotally attached to the downwardly extending trailing end portion of the reel supporting member 23. As shown, several pivot support lugs 28 can be spaced apart along the trailing end portion of the supporting member 23. The backwardly extending end of the linkage 27 is adapted to be pivotally connected to any one of the support lugs 28.

A hydraulic ram 29 is connected to the support frame structure, with one end of the hydraulic ram 29 being pivotally connected to the axis of the guage wheels 19 and the other end of the hydraulic ram being pivotally connected to the upper edge of the feeder housing 20. The frame structure in combination with the feeder housing 20 and the hydraulic ram 29 forms a self-proportioning means for raising and lowering the reel and the cutter bar. As the hydraulic ram 29 is extended, the frame structure reacts so as to pivot the reel support member 23 and the reel 25 upwardly. At the same time the feeder housing 20 is moved upwardly on its linkage 22 to the body 15 of the farm implement. Because of the arrangement of the interconnections between the members of the frame structure and the feeder housing 20, the reel 25 is raised a proportionally greater distance than the distance that the cutting platform or cutter bar 18 raises, i.e., for each increment that the cutter bar 18 raises, the reel 25 will raise a distance greater than the incremental movement of the cutter bar 18. The connection of the linkage 27 to the different support lugs 28 is used to vary the desired ratio of movement of the reel 25 and the cutter bar 18. Of course, when the hydraulic ram 29 is retracted, the reel 25 and the cutter bar 18 are lowered, with the same proportional movement relative to each other as described above.

In accordance with the present invention, an automatic system is provided for raising and lowering the reel 25 and the cutter bar 18 in response to sonar activated means which continuously monitors the top of the crop just ahead of the header. The automatic system of the present invention is shown schematically in block diagram in FIG. 2. The system includes at least one range finder unit 24. Preferably, the system will include at least one pair of range finder units, with the respective units being mounted on the opposite lateral sides of the reel 23. As shown in FIG. 1, the range finder units 24 are preferably mounted on extension arms 30 which extend ahead of the reel 25. The range finder units 24 are mounted so as to face downwardly toward the top of the crop in front of the header. The positioning of the range finder units 24 is not critical; the only requirement being that the range finder units 24 have a clear, unimpeded sight of the top of the crop. It is, of course, not desirable to have the range finder units 24 positioned too far ahead of the reel 25 inasmuch as the object is to monitor the crop in the near vicinity of the reel 25. It has been found preferable to angle the range finder units 24 back slightly towards the reel 25. The slight angle of the sonar range finder units 24 has been found desirable in improving the sonar monitoring of the top of the crop, and, of course, slight rearward angle allows the top of the crop to be monitored at a point very close to the forward portion of the reel 25. The rearward angle also helps compensate for the fact that the range finder unit is pivoted on a longer radius arm than is the reel, as determined by the length of the extension arm 30.

As mentioned previously, at least one range finder unit 24 and corresponding extension arm 30 is required, but it is advantageous to have an extension arm 30 at each side of the reel 25, with at least one range finder unit 24 mounted on each of the arms 30. With two extension arms 30, one at each side of the reel 25, and associated range finder units 24, the respective range finders can be used to control the hydraulic rams 29 at the opposite ends of the reel 25 in independent fashion. Thus, the opposite ends of the reel 25 and cutter bar 18 can be raised and lowered independently of the opposite side in response to the height of the crop in the vicinity of the respective ends of the reel 25.

Referring again to FIG. 2, the range finder units 24 are connected by appropriate electrical cables or conduits 26 to a central processing unit 31. The central processing unit 31 is adapted to process the data generated by the range finder units 24 and to determine if an appropriate correction should be made in the positioning of the reel 25 and cutter bar 18. The central processing unit 31 is adapted to generate generally only two sets of outputs. One set of outputs indicates that the right-hand side of the header 17 should be repositioned, i.e., either raised or lowered. The other set of outputs indicates that the left-hand side of the header 17 should be repositioned, i.e., either raised or lowered. The sets of outputs from the central processing unit 31 are transferred electronically through an electrical cable or conduit 33 to respective means such as electric motors or electromechanical devices which are adapted to drive the hydraulic rams 29 on the opposite lateral sides of the header 17. As illustrated, the outputs from the central processing unit 31 are transmitted to respective electromechanical devices for controlling the flow of hydraulic fluid to the respective left-hand and right-hand hydraulic rams 29 at the opposite lateral sides of the header 17. The electromechanical devices advantageously comprise solenoid activated, hydraulic reversing valves 32. The valves 32 are adapted to perform essentially three functions. First, they can supply a flow of hydraulic fluid to respective first ends of the respective hydraulic rams 29 while permitting hydraulic fluid to flow from the other ends of the rams 29. Second, they can reverse the flow of hydraulic fluid so as to supply hydraulic fluid to the other ends of the respective hydraulic rams 29 while permitting hydraulic fluid from the respective first ends of the hydraulic rams 29. Third, they can hold a state of equilibrium in which hydraulic fluid is neither supplied to nor withdrawn from either ends of the respective hydraulic rams 29. The three functions are selectively performed in accordance with the respective output signals from the central processing unit 31. When the output from the central processing unit 31 calls for an increase in the height of the left-hand side of the header 17 the corresponding left-hand valve 32 is activated to supply hydraulic fluid to extend the hydraulic ram 29 at the left side of the header 17. When the output from the central processing unit 31 calls for a decrease in the height of the left-hand side of the header, the corresponding left-hand valve 32 reverses the flow of hydraulic fluid to the respective hydraulic ram 29, i.e., to retract the hydraulic ram 29. The operation of the right-hand hydraulic ram 29 is controlled in a similar manner, with the output from the central processing unit which is associated with the right-hand reversing valve 32. The hydraulic valves are preferably of the simple reversing type in which a constant flow of fluid is supplied to the cylinder when the respective valve 32 is in its activated condition and no flow is allowed to the cylinder when that valve 32 is in its neutral condition. The hydraulic reversing valves 32 are supplied with hydraulic fluid from any appropriate, convenient source (either normally open or closed system), the source being shown in FIG. 2 simply by the box identified by numeral 38. In practice, the hydraulic fluid will be supplied from the hydraulic system of the farm implement as is well known in the art.

As at least implicit from what has been described herebefore, the range finder units 24 are duplicated. At least one unit is provided for the right and at least one unit is provided for the left. The circuitry of the range finder units 24, FIG. 3, and their support circuitry and the drive circuitry for driving the hydraulic reversing valves will also be duplicated. One for the left system and one for the right. In the description which follows the range finder units 24, their support circuitry and the drive circuitry will be described in more detail. For purposes of simplicity the descriptions hereafter will generally be given for a single circuit or unit, etc., but it should be remembered that the circuits or units are usually duplicated.

Figure 3:
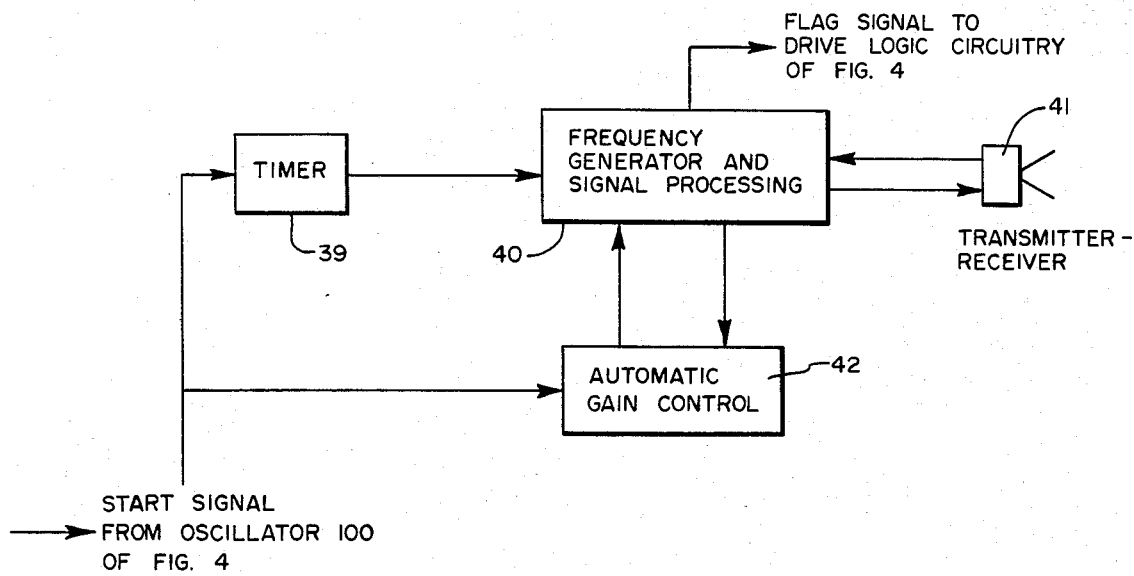
FIG. 3 is a simplified block diagram of one of the range finder or distance sensing components of the system shown in FIG. 2.

The range finder unit 24 is shown schematically in FIG. 3. The range finder 24 includes a timer 39 such as an astable multi-vibrator. The timer 39 initiates timed pulses upon receipt of a start signal from an oscillator in the drive logic circuitry of FIG. 4. The drive logic circuitry of FIG. 4 will be discussed more fully hereinafter. The timed pulses from timer 39 are transmitted to a frequency generator and signal processing unit 40 which generates repetitive bursts of electrical signals. Each burst, itself, comprises an alternating signal having a controlled frequency, and the individual bursts have a duration of generally from about 0.1 to 1 millisecond, preferably from about 0.2 to 0.5 milliseconds. The time separation between the repetitive bursts of signals is generally of a much larger duration than that of the bursts themselves. The critical parameter is that the time duration between the bursts of signals must be sufficient to accommodate (a) the transmission of the ultrasonic waves (produced and transmitted by the transducer 41 from the bursts of electrical signals) to the top of the crop, (b) the return of the reflected waves or echoes from the top of the crop to the transducer 41, and (c) the electronic verification of the electronic signals corresponding to the return echoes. Preferably, the bursts of signals are generated at a rate of about 10 to 100 bursts per second, with the time period between bursts being from about 10 to 100 milliseconds. The frequency of the alternating signal comprising each burst is within the range of conventional sonar frequencies, preferably from about 30 to 60 kilocycles or more per second.

Figure 2:
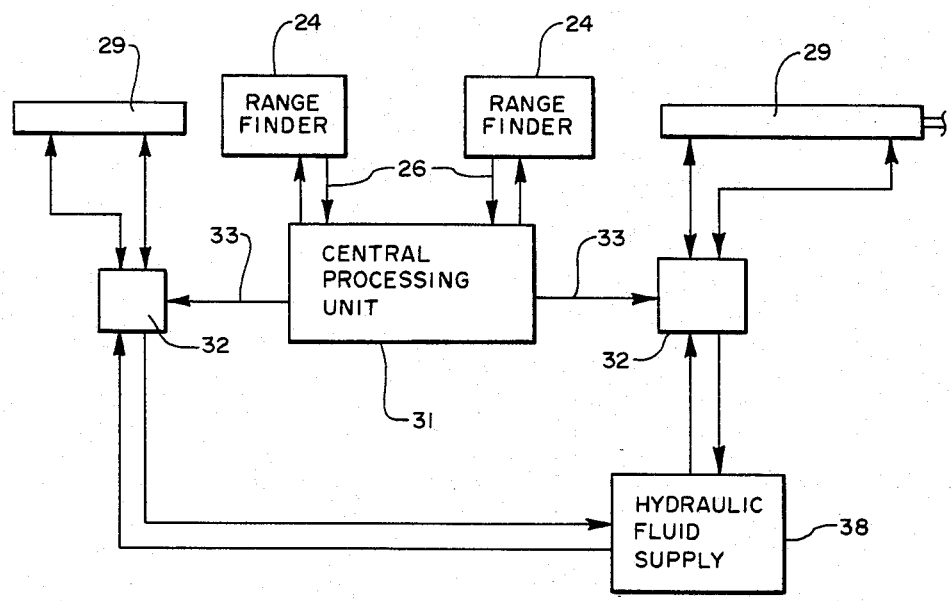
FIG. 2 is a block diagram illustrating diagramatically the operation of the guidance system of the present invention.

The bursts of electrical signals of controlled frequency are transmitted to transducer 41 which converts the bursts of electrical signals to corresponding bursts of ultrasonic waves, and the bursts of ultrasonic waves are directed outwardly from the transducer 41 which is installed in the range finder units 24 of FIGS. 1 and 2. Two or more range finder units 24 can be used on either side of the implement, and the benefit to be gained by a multiple system will be explained hereinafter. Even when multiple range finder units 24 are used as each side of the vehicle, the data generated by the range finder unit 24 closest to the top of the crop is selected for processing in the drive circuitry. Thus, for purposes of the present discussion only one range finder unit 24 will be considered.

As explained above, the range finder unit 24 transmits bursts of ultrasonic waves from the transducer 41 toward the top of the crop just ahead of the reel of the header 17. The bursts of ultrasonic waves are of the same duration as the bursts of electrical pulses which are transmitted to the transducer 41 from the frequency generator and signal processing unit 40, and the time period between the bursts of ultrasonic waves will be the same as the period between the bursts of electrical signals. The frequency of the ultrasonic sound comprising the bursts of ultrasonic waves is, of course, the same as the frequency of the electrical signals which are transmitted to the transducer 41. The frequency is within the range of conventional sonar frequencies, preferably from about 30 to 60 kilocycles or more per second. The ultrasonic waves are reflected by the top of the crop and return as echoes to the transducer 41 which is adapted to receive the echoes.

Echoes received by the transducer 41 are converted to corresponding electronic signals, and the electronic signals are detected and analyzed in the frequency generator and signal processing unit 40, which may have incorporated therewith an automatic gain control unit 42. A more detailed description of the circuitry comprising the frequency generator and signal processing unit 40 and the automatic gain control unit 42 will be given hereinafter. Briefly, however, it is noted that the automatic gain control circuitry is used to suppress noise which may be picked up by the transducer units 41. The automatic gain control circuitry works together with the amplification and signal processing portions of the frequency generator and signal processing circuitry 40, which as mentioned previously will be discussed more fully hereinafter. The range finder, as shown schematically in FIG. 3, can be supplied without the automatic gain control circuit 42 in applications where the background noise is small. Generally, however, it will be found advantageous to use the automatic gain control 42 in the signal processing. The processed signal from the frequency generator and signal processing unit becomes the flag signal as will be described more fully hereinafter, and the flag signal is transmitted to the drive logic circuitry for further processing as will also be described hereinafter.

Figure 7:
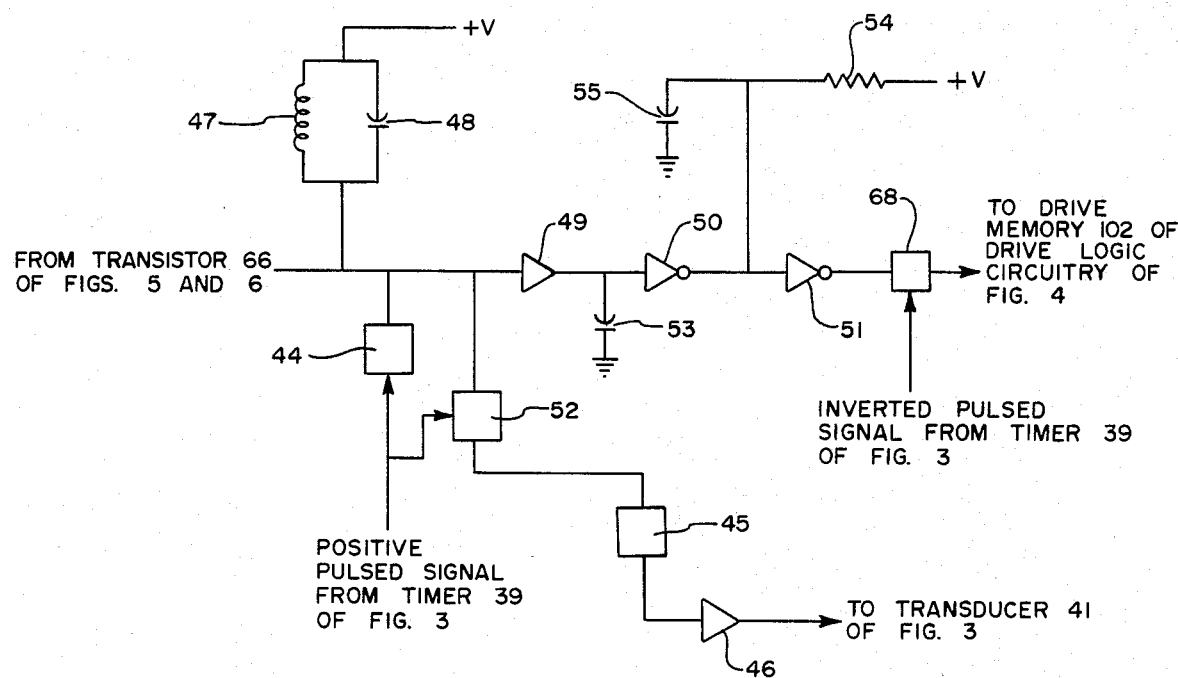
FIG. 7 is a simplified schematic diagram of one of a like pair of sonar echo signal verification circuits which are associated with the respective range finder or distance sensing components of the guidance system shown in FIG. 2.

A more complete description of the circuitry in the frequency generator and signal processing unit 40 will now be given. As indicated above, the frequency generator and signal processing unit 40 comprises circuitry adapted to produce electrical signals which are converted by the transducer 41 into transmitted ultrasonic signals. The ultrasonic signals, of course, have the same signal frequency and timing characteristics as the electrical signals from which they are generated by the transducer 41. Referring specifically to FIG. 7, the circuitry of the frequency generating and return signal processing unit is shown schematically. The bursts of electrical signals, which are subsequently converted into the bursts of ultrasonic waves, are generated by controlled pulsing an oscillator 44. The pulsing signal comes from the timer 39 of FIG. 3. The oscillator 44 is activated by the positive going ramp of the pulsing signal from the timer 39. In the preferred embodiment of the invention, the electrical frequency spikes or pulses within each burst of electrical signals produced by the oscillator are processed through wave shaping circuitry, such as a Schmitt trigger 45, prior to being sent to the transducer 41. The wave shaping circuitry converts the pulses to a generally square-wave shape, and the square-wave shape pulses are then amplified in amplifier 46 and sent to the transducer 41. The frequency of the output signals from the oscillator 44 is determined by the tank circuit of inductance coil 47 and capacitor 48. The coil 47 and capacitor 48 are wired in parallel between a positive voltage source and the output of the oscillator 44. The duration of the bursts of electrical signals are determined by the setting of timer 39, FIG. 3, and the time period between the bursts is determined by an oscillator 100, FIG. 4.

The tank circuit of coil 47 and capacitor 48 is also used in combination with the three amplifiers 49, 50 and 51 in processing the electronic signals corresponding to returning echo signals. To isolate the dual purposes circuitry during the generating and return pulse processing stages, a gate 52 is connected in series between the output of the oscillator 44 and the Schmitt trigger 45. The gate 52 is pulsed by the timer 39 so as to synchronize the output of the gate 52 with the activation period of the oscillator 44. During the cyclic periods in which the oscillator 44 is inactive, the return signal from the return signal amplifier circuitry of FIGS. 5 and 6 (the return signal amplifier circuitry of FIGS. 5 and 6 will be described further hereinafter) is connected in parallel with the tank circuit of coil 47 and capacitor 48 to the amplifier 49. The gate 52 prevents any electronic signals corresponding to return echo signals from being sent to the transducer 41 during this portion of the operation of the circuitry.

The return signal, i.e., the amplified electronic signals corresponding to echoes received by the transducer 41, undergoes verification in three related stages by the signal processing portion of the circuitry shown in FIG. 7. In the first stage, the pulses of the return signal are checked to be sure that they are of the same frequency as the ultrasonic sound waves transmitted from the transducer 41. The circuit comprising coil 47, capacitor 48 and the amplifier 49 will pass only those signals which have a frequency which matches that of the tuned circuit of coil 47 and capacitor 48. This is, of course, the same frequency as the transmitted ultrasonic sound waves inasmuch as the tank circuit of coil 47 and capacitor 48 determined the frequency of the electrical signals which were used to generate the transmitted ultrasonic sound waves. In the second stage, the capacitor 53, which is connected between the output of amplifier 49 and ground remains discharged whenever a continuous series of pulses is received from amplifier 49. The discharged state of capacitor 53 is passed to the next amplifier 50 as an indication of a continuous series of pulses as distinguished from random pulses. This eliminates the possibility of transmitting random pulses which may be received from a noise environment to amplifier 50. The third and final stage of return signal verification consists of the network of resistor 54 and capacitor 55 which are connected in series between a positive voltage source and ground, with the junction between the resistor 54 and capacitor 55 also being in electrical contact with the output of amplifier 50. The circuit comprising the resistor 54 and capacitor 55 will allow a signal from amplifier 50 to pass on to amplifier 51 only if a predetermined time has passed which represents a predetermined number of pulses present in the return signal. In summary, a signal representing the reception of a valid echo is sent forward from amplifier 51 only if all the following three conditions are met: (1) the return signal matches the transmitted signal in frequency, (2) the return signal consists of a continuous series of pulses (a condition that noise is unlikely to meet) and (3) a predetermined minimum number of pulses are present (also a condition that noise is unlikely to meet). If all the above conditions are met, the resulting signal generated by amplifier 51 triggers flip flop 68. The output of flip flop 68, referred to as a "flag", is sent to the drive logic circuitry of FIG. 4. The flip flop 68 is reset with the inverted pulsed output from timer 39 at the same time the noninverted or positive pulse from timer 39 activates oscillator 44 to initiate the part of the cycle in which the burst of electrical signals are converted to ultrasonic waves and transmitted by the transducer 41.

Figure 4:
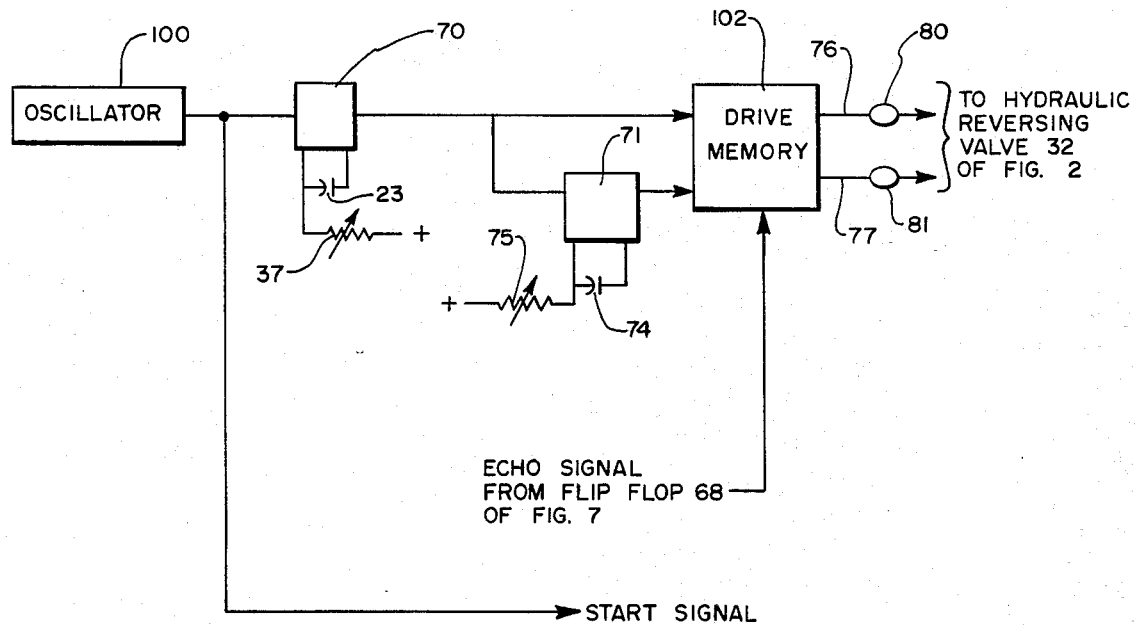
FIG. 4 is a simplified block diagram of one of a central processing unit of the drive logic components of the system shown in FIG. 2.
Figure 5:
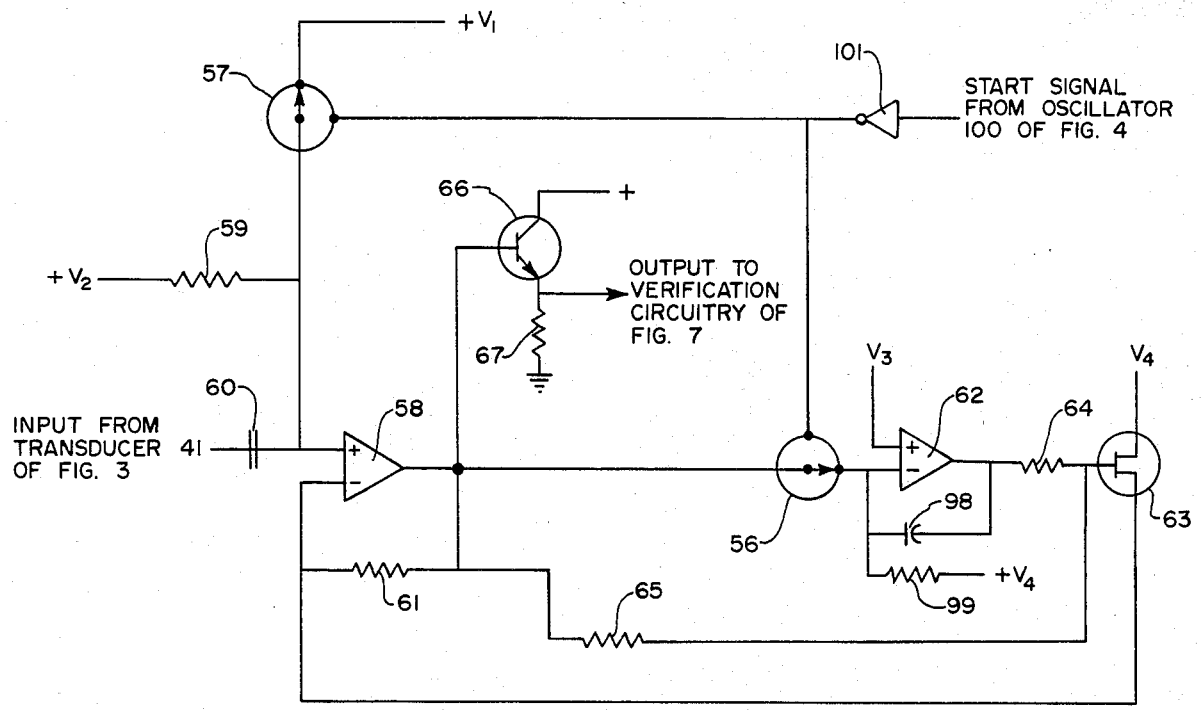
FIG. 5 is a simplified schematic diagram of one of a like pair of amplifier circuits which are associated with the respective range finder or distance sensing component of the guidance system shown in FIG. 2, with the circuitry being shown in its reset or static condition.
Figure 6:
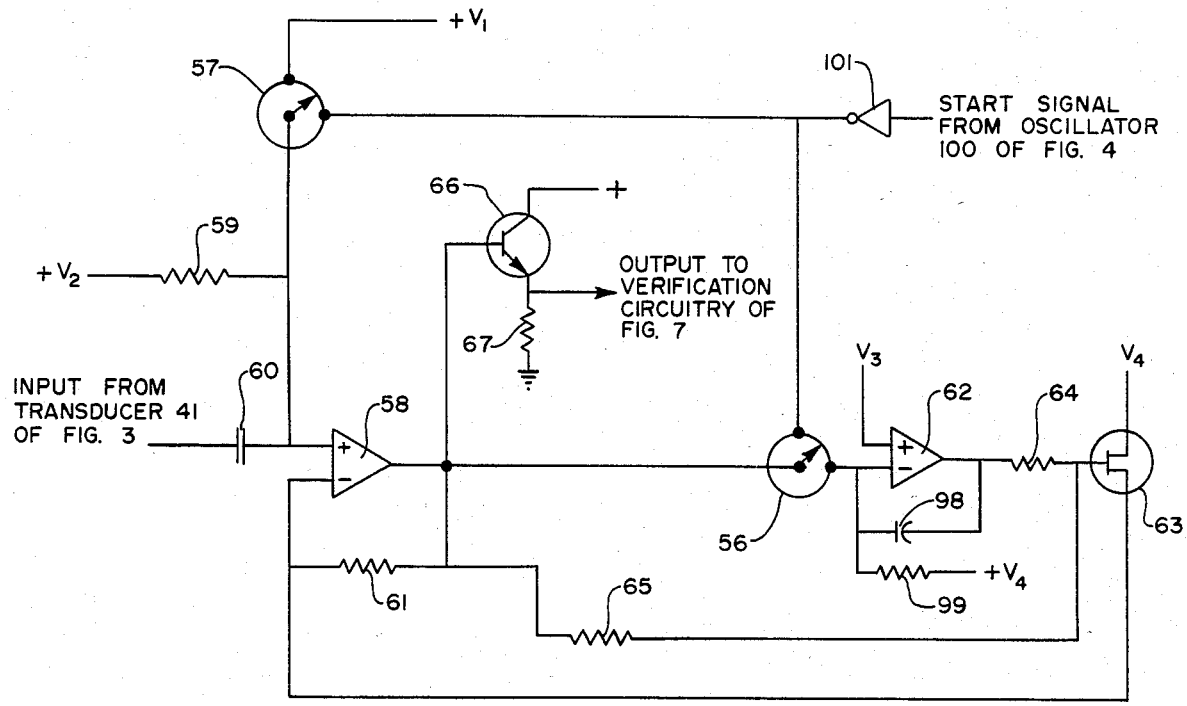
FIG. 6 is a simplified schematic diagram of the complete amplifier circuit of FIG. 5, with the circuitry being shown in an operational condition.

Before discussing the drive logic circuitry, the amplification of the return echo signal will be described with reference to FIGS. 5 and 6. Because a later echo may be weaker due to attenuation in air and so forth, the echo receiving circuitry contains time dependent automatic gain control to suppress noise. The automatic gain control is set before each transmission of a burst of ultrasonic waves and operates to increase circuit gain with time during the interval before the reception of the return echo signal. The amplifier automatic gain control circuitry is illustrated in FIGS. 5 and 6. In FIG. 5, the circuit is shown as it exists in the reset or initial state. Switches 56 and 57 are closed during the low portion of the output of oscillator 100 (FIG. 4). When the output of oscillator 100 is low, switches 56 and 57 are closed as illustrated in FIG. 5.

The switch 57 is connected in series between a positive voltage source $V_1$ and amplifier 58. A second voltage source $V_2$, which is of a lower positive value than $V_1$, in connected in series with a resistor 59 to the lead from the switch 57 to amplifier 58. The input echo signal from the transducer 41 through frequency generator and signal processing unit 40 is connected through capacitor 60 to the lead from the switch 57 to the amplifier 58. Neither the input through capacitor 60 nor resistor 59 have any effect because the amplifier 58 is connected directly to the positive voltage source $V_1$ through switch 57. The amplifier 58 is a standard operational amplifier which employs a feedback through resistance 61 which is connected between the output of the amplifier 58 and the input on the amplifier 58. Amplifier 62 is connected through switch 56 to the output of amplifier 58. With switch 56 in its on position, connection between the output of amplifier 58 and the input of amplifier 62 is made, and amplifier 62 functions as a comparison circuit to determine the difference between the input signal from amplifier 58 and an input voltage $V_3$ which is applied to the amplifier 62. The output of amplifier 62 varies the resistance of transistor 63, whose gate is connected through resistance 64 to the output of amplifier 62. The drain of transistor 63 is connected to the input of amplifier 58 along with the resistance 61. The source of transistor 63 is connected to a reference voltage source $V_4$. The resistance of transistor 63 operates in conjunction with the feedback resistance 61 of amplifier 58 to establish the initial gain such that the output of amplifier 58 is equal to $V_3$.

When the output of oscillator 100 in FIG. 4 goes high, the output of inverter 101 (FIGS. 5 and 6) goes low, and the low output opens switches 56 and 57 resulting in the amplifier circuitry configuration shown in FIG. 6. Amplifier 62, with its feedback loop through capacitor 98 and the connection to voltage source $V_4$ through resistor 99, now functions as an integrator generating a positive going ramp signal to transistor 63, which causes the resistance of transistor 63 to drop. The drop in resistance in turn increases the gain of amplifier 58. In the preferred embodiment of the invention, a resistor 65 is connected between the output of amplifier 58 and the gate of transistor 63 so as to shunt the switch 56 and the amplifier 62. When the switch 56 is open, the forward signal from amplifier 58 through resistance 65 supplies positive feedback to transistor 63 which also increases the gain of the amplifier 58. The combined gain of amplifier 58 increases in an accelerated manner until the amplifier 58 saturates. At the end of the output pulse from oscillator 100 the switches 56 and 57 return to their closed positions and the amplifier circuit, comprising the amplifiers 58 and 62, is reset to its original gain. Accordingly, during each pulse from the gate 14, the gain of the amplifier circuit comprising amplifiers 58 and 62 increases in an accelerated manner until the amplifier system is saturated or until the end of the pulse from oscillator 100. This gives an automatic gain control for amplifying the return echoes which are picked up by the transducer 41 of the range finder unit 24. Strong echoes which are received from objects relatively close to the range finder unit 24 need less amplification than weaker echoes which are received from objects more distant from the range finder unit 24. The accelerated gain of the amplifier system provides the increased amplification necessary for the weaker return echo signals.

The amplified return signal echoes from the amplifier 58 of the amplifier circuitry of FIG. 6 are fed through the impedance matching transistor 66 shown in FIGS. 5 and 6 to the verification circuitry of FIG. 7 which has been described hereinbefore. As illustrated, the output from the amplifier 58 is transmitted to the base of the transistor 66 and the collector of the transistor is connected to a reference voltage shown simply as being of a positive potential. The emitter of the transistor 66 is connected to ground through a resistance 67, and the output signal from the emitter of transistor 66 is fed forward to the verification circuitry of FIG. 7. As mentioned previously, in some applications the use of an amplifier embodying the automatic gain feature is not necessary. In such applications the input from the transducer 41 of FIG. 3 can be transmitted through a capacitor such as capacitor 60 to a simple amplifying means as well known in the art, and the output of that amplifying means is then fed through an impedance matching transistor such as transistor 66 to the verification circuit of FIG. 7.

It will, of course, be recognized that during the cyclic time periods in which the output of oscillator 100 is low, the only signals being picked up by the transducer 41 are noise or other irrelevant signals. Such signals will not be processed by the amplifier circuit comprising amplifiers 58 and 62 as illustrated because the input to amplifier 58 is shorted to the positive voltage source $V_1$ through switch 57. The amplifier circuit is, as explained above, in a reset condition and ready to process return echo signals every time the output of oscillator 100 goes high.

The amplified return echo signals are subjected to the verification circuitry of FIG. 7, and as discussed hereinbefore, those signals which are verified as representing true return echoes are forwarded as an output level, referred to as the "flag", from flip flop 68 to the drive logic circuitry of FIG. 4. The flag is transmitted to the drive memory unit 102 of the drive logic circuitry.

The output from oscillator 100 is applied to timer 70. The timer 70 is provided with external time control means comprising the capacitor 73 and a potentiometer 37. The potentiometer 37 is connected to a positive reference voltage. The timer 70 is adapted to generate an output pulse with a variable time period after receiving a high from oscillator 100. The variable time period can be adjusted by varying the resistance of the potentiometer 37. The trailing edge of the output pulse from timer 70 will be referred to as $M_A$, and it represents the "close in" range with respect to the drive logic. The signal $M_A$ is transmitted to the drive memory unit 102 and the timer 71.

The timer 71 is provided with external time control means comprising a capacitor 74 and a potentiometer 75. The potentiometer 75 is connected to a positive reference voltage. The timer 71 is adapted to generate an output pulse having a predetermined duration upon receipt of the $M_A$ pulse from the timer 70. The duration of the output pulse from timer 71 is set by adjustment of the potentiometer 75. The trailing edge of the output pulse from the timer 71 will be referred to as $M_B$, and it represents the "far distance" range with respect to the drive logic. The signal $M_B$ is transmitted to the drive memory unit 102.

The flag pulse signal from the flip flop 68 is sent to the drive memoory unit 102 and compared with the $M_A$ and $M_B$ pulse signals from timers 70 and 71, respectively. The flip flop 68 is reset by each pulse from the timer so that a corresponding flag pulse signal is generated for each respective pairs of pulse signals $M_A$ and $M_B$. If the flag signal, which represents a return echo which has been received and verified, is detected by the drive memory unit 102 prior to the detection of a corresponding $M_A$ signal, it indicates that the return echo has come back too soon. In other words, the top of the crop, whose distance from the range finder units 24 is being measured, is "too close" to the range finder units 24 and not out past the predetermined "close in" range as determined by the pulse signal $M_A$. If the flag pulse signal is detected following the detection of the $M_A$ signal, then the drive memory unit 102 further determines whether or not the flag pulse was detected prior to the detection of the $M_B$ signal. If the flag signal has not been detected prior to the detection of $M_B$, it indicates that the return echo has not come back soon enough, and that the top of the crop, whose distance from the range finder units 24 is being measured, is "too far" from the range finder units 24. If the flag pulse signal is detected after the detection of the pulse signal $M_A$ but before the detection of the pulse signal $M_B$, then the top of the crop, whose distance from the range finder units 24 is being measured, is within the desired range.

The drive memory unit 102 is further adapted to generate three possible responses. First, when the flag pulse signal is detected prior to the detection of the pulse signal $M_A$, then an output (a "too close" signal) is generated in an output conductor 76. Second, when the flag signal is detected following the detection of signal $M_A$ but before the detection of the signal $M_B$, then no output is generated to either of the output conductors 76 and 77. Third, when the flag signal has not been detected prior to the detection of signal $M_B$, then an output (a "too far" signal) is generated in output conductor 77. Whenever an output has been generated on either of the output conductors 76 and 77, it will remain until a new decision is made by the drive memory circuit 102 based on the timing of the $M_A$, $M_B$ and flag signals. In no case will there be an output on both conductors 76 and 77 at the same time.

The signal in output conductor 76 activates a transistor 80 which, in turn, activates the hydraulic reversing valve 32 (FIG. 2) to supply hydraulic fluid to the hydraulic ram 29 and thereby raise the respective end of the header 17 corresponding to that particular ram 29. The signal in output conductor 77 activates a transistor 81 which, in turn, activates the hydraulic reversing valve 32 to supply hydraulic fluid to the hydraulic ram 29 so as to lower the respective end of the header 17 corresponding to that particular ram 29.

In operation, as the header moves cross the field, the sonar sensor units 24 continuously monitor the top of the crop. If the top of the crop is sensed as being low, either because the stalks of the crop are not as high or there is a local depression in the field where the crop is growing, the respective sonar sensor unit 24 and its associated circuitry detects the decrease in height, and the system activates the hydraulic ram corresponding to the sonar sensor unit to lower the header 17. As noted, there are two sets of sonar sensor units at the opposite lateral sides of the header, and the circuitry associated with the sonar sensor units is adapted to drive the respective hydraulic rams 29 at the ends of the header. Each end of the header can be raised or lowered independently of the movement of the other end. Thus, if the height of the crop falls off near the right side of the header but remains fairly constant near the left end of the header, the sonar sensing means corresponding to the right side of the header will activate the right-hand hydraulic ram so as to reduce the height of that end of the header, while the left end of the header will remain at its height with no change. If the height of the crop at either end of the header increases, then the ends of the header will automatically be adjusted upwardly.

Although preferred embodiments of the automatic height control system of the invention have been illustrated and described, it is to be understood that the present disclosure is made by way of example and that various other embodiments are possible without departing from the subject matter coming within the scope of the following claims, which subject matter is regarded as the invention.

We claim:

1. In a header height control system for a mobile farm implement having a body carrying a mounted header, an automatic control system for continuously controlling the operating height of the header, said control system comprising:

a sonar sensor means mounted on the header and positioned so as to be spaced just ahead of the front, leading end of the header, said sonar sensor means being adapted to generate and transmit ultrasonic waves toward the top of the crop in the vicinity immediately ahead of the header in the transport direction of the farm implement and to receive reflected, ultrasonic, echo waves reflected from said top of the crop back to said sonar sensor means, said sonar sensor means further being adapted to generate an electronic output corresponding to said reflected ultrasonic echo waves;

amplifying means for amplifying the electronic output of the sonar sensor means;

verifying means for verifying that said electronic output represents true, reflected, ultrasonic, echo waves from the top of the crop;

drive logic means adapted to analyze said electronic output which has been amplified and verified, and to generate a drive output corresponding to the distance between the sonar sensor means and the top of said crop as determined from the analysis of the amplified and verified electronic output of the sonar sensor means;

and power lift means for raising and lowering the header; and means for activiating the power lift means of said header to continuously and automatically control the positioning of said header in accordance with the drive output of said drive logic means.

2. A control system in accordance with claim 1, wherein:

said sonar sensor means is adapted to generate a train of bursts of pulses of ultrasonic waves with the pulses in each burst of pulses comprising ultrasonic waves having a uniform designated frequency and with the bursts in the train being repetitive and having a uniform time interval between bursts; and said verifying means is adapted to analyze the electronic reflected output from the sonar sensor means during the spaced time interval between said bursts of pulses of ultrasonic waves from the sonar sensor means and to pass said reflected output to the drive logic means only when all the following three conditions are met: (1) the signals in the electronic output from the sonar sensor means have the same frequency as the frequency of the ultrasonic waves transmitted from the sonar sensor means, (2) the signals in the electronic output consists of a continuous series of pulses, and (3) the signals in the electronic output consist of a predetermined minimum number of pulses.

3. A control system in accordance with claim 1, wherein the power lift means comprises a hydraulic ram, and wherein said means for activating the power lift means comprises an electromechanical valve which is adapted to supply hydraulic fluid under pressure to the respective ends of the cylinder of said hydraulic ram in accordance with the drive output of said drive logic means.

4. In a header height control system for a mobile farm implement having a body carrying a mounted header, an automatic control system for continuously controlling the operating height of the header, said control system comprising:

a sonar sensor means mounted on the header and positioned so as to be spaced just ahead of the front, leading end of the header, said sonar sensor means comprising a transducer/transmitter which is adapted to convert first electrical signals to ultrasonic waves and transmit the ultrasonic waves toward the top of the crop in the vicinity immediately ahead of the header in the transport direction of the farm implement, and a transducer/receiver which is adapted to receive reflected, ultrasonic, echo waves from the top of the crop and to convert said echo waves to second electrical signals;

first electrical circuitry for producing repetitive bursts of pulses of said first electrical signals and transferring the pulses of said first electrical signals to said transducer/transmitter for conversion to corresponding pulses of said ultrasonic waves, wherein said first electrical signals comprises an alternating voltage which alternates at a set frequency and wherein each of said bursts of pulses has a uniform, set duration and the bursts of pulses are repeated with uniform, spaced time intervals therebetween;

second electrical circuitry for amplifying said second electrical signals which are produced by said transducer/receiver and which correspond to reflected, ultrasonic, echo waves from the top of the crop, third electrical circuitry being adapted to pass only those second electrical signals produced by said transducer/receiver which match three specific criteria and to block or screen out all other electrical signals which may be produced by said transducer/receiver, said three criteria consisting of (1) the second electrical signals must be of the same frequency as the frequency of said first electrical signals produced by said first electrical circuitry, (2) the second electrical signals must consist of a continuous series of pulses, and (3) a predetermined minimum number of pulses must be present;

fourth electrical circuitry for analyzing the verified, second electrical signals and generating output drive signals, said fourth electrical circuitry comprising means for generating a pair of reference signals for each burst of pulses of said first electrical signals as produced by said first electrical circuitry, said pairs of reference signals being timed with respect to mutually respective bursts of pulses of said first electrical signals such that the first reference signal of each pair of reference signals is generated at a preset time following the initiation of the mutually respective bursts of pulses of said first electrical signals and the second reference signal of each pair of reference signals is generated at a preset time following the initiation of said first reference signal, said fourth electrical circuitry further comprising a logic circuit which compares each of the verified second electrical signals passing through said third electrical circuitry with the mutually respective first and second reference signals, with said fourth electrical circuitry being adapted to (1) produce a first drive signal whenever the verified second electrical signals from the third electrical circuitry are detected by said fourth electrical circuitry before a corresponding first reference signal has been generated, (2) produce a second drive signal whenever the first and second reference signals have been generated before the mutually corresponding verified second electrical signal from the third electrical signal has been detected, and (3) produce no drive signal whenever the verified second electrical signal from the third electrical circuitry is detected after the generation of a mutually corresponding first reference signal and before the generation of a mutually corresponding second reference signal;

power lift means for raising and lowering the header; and actuation means adapted to receive the drive signals from the logic circuit of said fourth electrical circuitry and to activate the power lift means of said header in accordance with said drive signals, whereby (1) when said first drive signal is received, the actuation means operates said power lift means to move said header in one of the upward or downward directions, (2) when said second drive signal is received, the actuation means operates said power lift means to move said header in the other of the upward or downward directions, and (3) when do drive signal is received, the actuation means maintains the header in a steady position with no correction either upwardly or downwardly.

5. An automatic control system in accordance with claim 4, wherein said first electrical circuitry comprises wave shaping means which converts the pulses of said first electrical signals to a generally square-wave shape, and said first electrical circuitry further comprises amplifier means to amplify the square-wave pulses which are transferred to said transducer/transmitter.

6. An automatic control system in accordance with claim 5, wherein said first electrical circuitry further comprises an oscillator, a tank circuit of an inductance coil and a capacitor wired in parallel between a positive voltage source and the output of the oscillator, and a conductor means connected between the output of the oscillator and said transducer/transmitter, whereby the pulses of said first electrical signals are generated by the oscillator and the frequency of the pulses of said first electrical signals are determined by said tank circuit.

7. An automatic control system in accordance with claim 6 wherein the third electrical circuitry comprises three amplifiers, a gate means interposes in said conductor means so that said gate means is connected in series between the output of said oscillator and said transducer/transmitter, and a timed flip flop, wherein the amplifiers are connected in series; the output of the oscillator and the input of the second electrical signal produced by said transducer/receiver are connected to the input of the first of said amplifiers; and the timed flip fop is connected to the output of the third of said amplifiers, whereby whenever the first electrical circuitry is producing a burst of trains of pulses of said first electrical signals, the flip flop is timed to prevent a transfer of a signal therethrough and the gate means is timed to allow the first electronic signals to be transmitted to said transducer/transmitter, and during the time interval between bursts of trains of pulses of said first electrical signals, the gate means is timed to prevent transmission of the input of the second electrical signals to said transducer/transmitter and the flip flop is timed to pass said second signals which have been verified, that is, have passed through the tank circuit and amplifier arrangement.

8. An automatic control system in accordance with claim 4, wherein the power lift means comprises a hydraulic ram and wherein said actuating means comprises an electromechanical valve which is adapted to supply hydraulic fluid under pressure to the respective ends of the cylinder of said hydraulic ram in accordance with the drive output of the logic circuit of said fourth electrical circuitry.

9. A method for automatically and continuously controlling the raising and lowering of a header which is connected to a mobile farm implement, said method comprising the steps of:

generating a train of bursts of pulses of ultrasonic waves, with the pulses in each burst of pulses comprising ultrasonic waves having a uniform designated frequency and with the bursts being repetitive and having a uniform time interval between bursts;

transmitting said bursts of pulses of ultrasonic waves from a transmitter/receiver toward the top of the crop in the vicinity immediately ahead of the header in the transport direction of the farm implement;

monitoring ultrasonic, echo waves which are reflected from the top of the standing crop, said monitoring being done by the receiver portion of said transmitter/receiver;

converting the monitored ultrasonic echo waves to electronic signals having the same frequency and other time characteristics of the ultrasonic echo waves;

amplifying said electronic signals;

verifying that the amplified, electronic signals represent true, reflected, ultrasonic echo waves from the top of the crop;

analyzing the amplified and verified electronic signals to determine if the distance from the top of the crop to the transmitter/receiver is outside allowable limits; and actuating power lift means associated with the header, said power lift means being adapted to move said header upwardly or downwardly in accordance with the analysis of the amplified and verified electronic signals.

10. A method in accordance with claim 9, wherein the verification of the electronic signals is achieved by allowing the return signal to pass to the analyzing step when all the following three conditions are met: (1) the electronic signals have the same frequency as the frequency of the transmitted ultrasonic waves, (2) the electronic signals consist of a continuous burst or series of pulses, and (3) the electronic signals in each burst or series consist of a predetermined minimum number of pulses.

11. A method in accordance with claim 9, wherein the analization of the verified electronic signals is achieved by:

generating a pair of reference signals for each burst of trains of said ultrasonic waves which are transmitted toward the top of the standing crop, said pair of reference signals being timed such that the first reference signal of said pair is generated at a preset time following the initiation of the mutually respective burst of said ultrasonic waves and the second reference signal of said pair is generated at a preset time following the initiation of said first reference signal;

comparing each of the verified electronic signals with the first and second reference signals of a mutually corresponding pair of reference signals produced by the burst of ultrasonic waves;

producing a first drive signal which is adapted to cause the actuation of the power lift means to move the header in an upward direction whenever the verified electronic signal is detected before a mutually corresponding first reference signal has been generated;

producing a second drive signal which is adapted to cause the actuation of the power lift means to move the header in a downward direction whenever a verified electrical signal has not been detected before detection of the reference signals; and producing no drive signal whenever the verified electrical signal is detected after the generation of a mutually corresponding first reference signal and before the generation of a mutually corresponding second reference signal.

* * * * *